United States Patent [19]

Johnson et al.

[11] 4,142,648
[45] Mar. 6, 1979

[54] CAP ASSEMBLY FOR A FUEL TANK

[75] Inventors: Lawrence P. Johnson, Huron; William C. Vogel, Sandusky, both of Ohio

[73] Assignee: General Motors Corporation, Detroit, Mich.

[21] Appl. No.: 916,764

[22] Filed: Jun. 19, 1978

[51] Int. Cl.² .............................................. B65D 51/16
[52] U.S. Cl. ..................................... 220/203; 220/303
[58] Field of Search ............... 220/203, 288, 303, 202, 220/210; 137/493, 493.6, 493.7

[56] References Cited

U.S. PATENT DOCUMENTS

| 3,937,358 | 2/1976 | Smith et al. | 220/203 |
| 3,985,260 | 10/1976 | Evans | 220/203 |
| 3,986,634 | 10/1976 | Smith et al. | 220/288 |
| 4,065,026 | 12/1977 | Williams | 220/288 |
| 4,091,955 | 5/1978 | Sloan, Sr. | 220/203 |

Primary Examiner—George T. Hall
Attorney, Agent, or Firm—Donald F. Scherer

[57] ABSTRACT

A cap assembly for a fuel tank filler tube having a low profile housing. The outer shell of the cap is a dome-shaped sheet metal member backed by a dome-shaped impact resistant cap support member secured between the outer shell and the threaded closure portion of the cap assembly and urged into abutment with the outer shell by resilient fingers formed integrally with the cap support member. The assembly also includes valve means which are communicated with the interior of the tank and atmosphere through passages formed in the threaded closure member and the cap support member.

1 Claim, 2 Drawing Figures

CAP ASSEMBLY FOR A FUEL TANK

This invention relates to fuel tank filler caps and more particularly to low profile caps providing a positive seal with the fill tube of the fuel tank.

An object of this invention is to provide an improved fuel fill tube cap having a low profile and impact resistance.

Another object of this cap having a low profile dome-shaped sheet metal outer member and an impact resistant inner member having a corresponding dome-shape.

Another object of this invention is to provide an improved fuel filler cap having a low profile dome-shaped outer member, a threaded member having a central recess spaced from the outer member, and a support member positioned partially in said recess and maintained in abutment with the outer member by resilient fingers formed integrally with the support member to provide structural integrity for the outer member.

These and other objects and advantages of the present invention will be more apparent from the following description and drawing in which.

Figure 1:
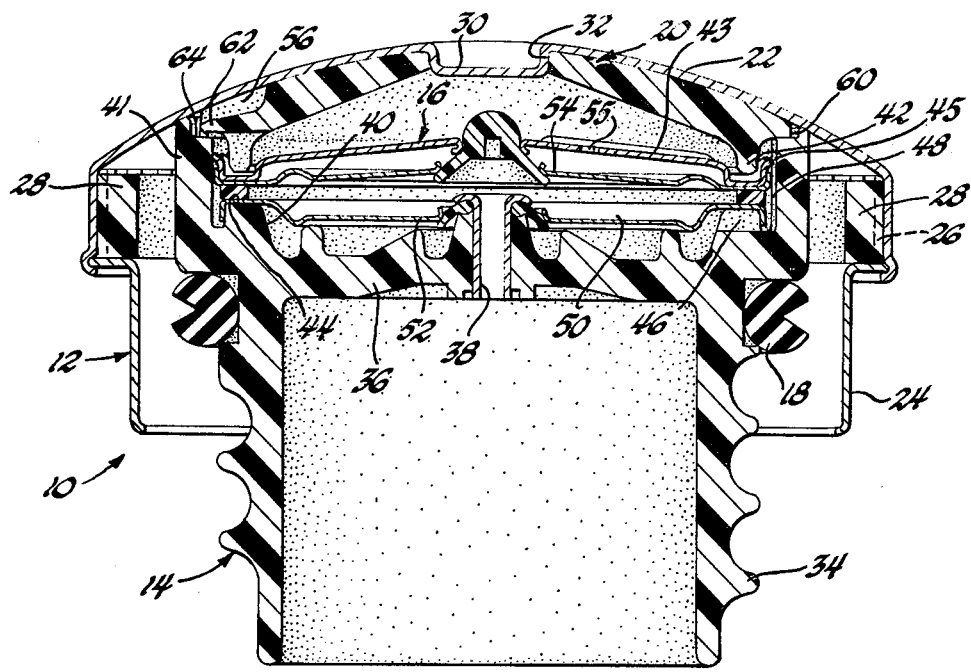
FIG. 1 is a sectional elevational view of a filler cap.
Figure 2:
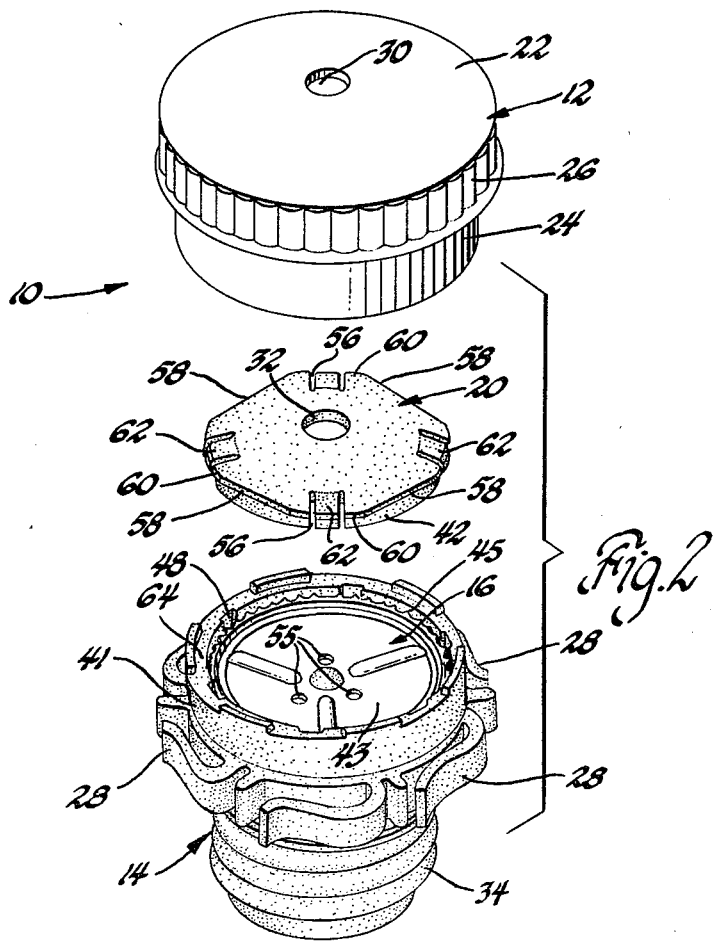
FIG. 2 is an exploded view of the filler cap.

Referring to the drawings, there is seen in FIG. 1 a cap assembly, generally designated 10, which is made up of a cap member 12, a closure member 14, a valve assembly 16, a grooved seal ring 18, and an impact resistant cap support member 20. The cap member 12 is preferably made of sheet metal and has a domed outer surface 22 and a skirt portion 24, adapted to fit over the fill tube of a fuel tank, not shown. The cap member 12 also includes a plurality of cam surfaces 26 which cooperate with fingers 28 formed on the closure member 14. The domed surface 22 has a dimpled portion 30 in the center thereof which fits in a recess or opening 32 formed in the cap support member 20 to provide radial support for cap 12.

The closure member 14 has a threaded surface 34, adapted to engage the inner surface of the fuel filler tube, and an upper cylindrical body portion 36. The cylindrical body portion 36 has a central opening 38 adapted to be in communication with the interior of the fuel tank and a recessed area 40, surrounded by an annular wall 41, in which is disposed the valve assembly 16 and an axially extending rim 42 on the cap support member 20. A retainer plate 43, of valve assembly 16, has the outer edge 45 embedded in the annular wall 41 to position the valve assembly in the closure member 14. The surface 44 has a plurality of radially extending slots 46 formed therein while the annular wall 41 has a plurality of axially extending slots 48 formed therein. The slots 46 and 48 cooperate with the valve assembly 16 to permit communication between atmosphere and the central opening 38. The valve assembly 16 is substantially the same as the valve assembly disclosed in U.S. Pat. No. 3,937,358 to Smith et al, issued Feb. 10, 1976, and assigned to the assignee of the present invention, and reference may be had thereto for a complete discussion of the operation of the valve.

For the purpose of this disclosure, it is sufficient to recognize that when a vacuum is generated in the space 50 formed between the vacuum diaphragm 52 and pressure diaphragm 54 of the valve assembly 16, the vacuum diaphragm 52 will be moved upwardly to permit atmospheric air to pass through the center of diaphragm 52 and reduce the vacuum condition in the fuel tank.

Should a superatmospheric pressure occur in the space 50, the pressure diaphragm 54 will move upwardly and permit the exhaust of the excess pressure through the center of diaphragm 54. The excess vapor which passes through the pressure diaphragm 54 is exhausted to atmosphere through a plurality of openings 55 formed in the retainer 43 and through openings 56 formed on the cap support member 20.

The fingers 28 and cam surfaces 26 cooperate to form a torque limiting arrangement for the cap during tightening thereof in the fuel filler tube. A more complete understanding of this arrangement can be found in U.S. Pat. No. 3,986,634 to Smith et al, issued Oct. 19, 1976, and assigned to the assignee of the present invention.

For the purpose of this disclosure, it is sufficient to recognize that as the cap is rotated in the tightening direction of the thread 34, the fingers 28 will be permitted to ratchet on cam surfaces 26 after a predetermined tightening torque has been achieved, thus limiting the tightening torque.

The grooved seal ring provides a compliant seal between the filler tube and the cap and is the subject of U.S. Pat. No. 4,065,026 to Williams et al, issued Dec. 27, 1977, and assigned to the assignee of the present invention, where the reader may find a more complete description of this seal and the operation thereof.

The cap support member 20 has four substantially straight sides 58 which are joined by circular sections 60. The circular sections 60 have formed integrally therewith, and extending into each of the openings 56, a resilient finger member 62. The flatted portions 58 assist in the communication of atmosphere to the axial slots 48 and radial slots 46 formed in the closure 14. The resilient finger members 62 abut an annular surface 64 formed on the closure member 14 to urge the dome-shaped portion of cap support 20 into abutting relation with the dome-shaped surface 22 of the cap 12 and maintain the rim 42 spaced from the valve assembly 16. These cooperating dome-shaped members and the rim 42 cooperate to provide improved structural rigidity for the sheet metal cap member without the need for an additional handle piece, as used in the prior caps, being welded or otherwise secured to the cap 12. Thus, a lower profile is achieved which permits the use of this cap in a more confined space.

The impact resistant cap support member 20 is preferably made from a plastic or elastic synthetic polyamide material such as nylon. Should the dome-shaped portion of the cap 12 be struck with an exterior force, the cap support 20 will provide structural integrity for the dome-shaped member to prevent substantial deformation thereof and reduce the likelihood of the sheet metal being pierced. The resilient fingers 62 assist in maintaining the cap support 20 in abutment with the cap 12 while permitting the slight freedom of movement of the two members upon impact due to the space between rim 42 and valve assembly 16.

Obviously, many modifications and variations of the present invention are possible in light of the above teachings. It is therefore to be understood that within the scope of the appended claim the invention may be practiced otherwith than as specifically described.

The embodiments of the invention in which an exclusive property or privilege is claimed are defined as follows:

1. A cap assembly for closing a fuel tank, said cap assembly comprising; a threaded member having a cylindrical portion having a substantially closed end, an open end, an inner wall between said ends, and an end wall at said open end; a cap member for covering said cylindrical portion having a dome-shaped portion enclosing said cylindrical portion; an impact resistant cap support having a dome-shaped portion abutting the dome-shaped portion of said cap member for support of same, a rim portion supported on the end wall of said cylindrical portion and a plurality of radially extending resilient fingers formed within said rim portion and abutting said end wall to urge said cap support toward said cap member, valve means disposed within said cylindrical portion and communicating with the fuel tank for maintaining a desired pressure range within the fuel tank; and vacuum relief slot means for communicating said fuel tank with atmosphere through said valve means when a predetermined vacuum is present in said fuel tank comprising, a plurality of radial slots formed in the substantially closed end of said cylindrical portion communicating with said valve means and a plurality of axially extending slots formed in the inner wall of said cylindrical portion communicating with said radial slots and with atmosphere through said cap support.

* * * * *

UNITED STATES PATENT AND TRADEMARK OFFICE
CERTIFICATE OF CORRECTION

PATENT NO. : 4,142,648

DATED : March 6, 1979

INVENTOR(S) : Lawrence P. Johnson et al

It is certified that error appears in the above-identified patent and that said Letters Patent are hereby corrected as shown below:

Column 1, line 9, "Another object of this cap" should read
-- Another object of this invention is to provide an improved filler cap --.

Signed and Sealed this

Twenty-ninth Day of May 1979

[SEAL]

Attest:

RUTH C. MASON
Attesting Officer

DONALD W. BANNER
Commissioner of Patents and Trademarks